Aug. 8, 1967  NOBUO SUGIMOTO ET AL  3,334,787
VIBRATORY HOPPER FEEDER

Filed Oct. 11, 1965  3 Sheets-Sheet 2

N. Sugimoto & M. Miyano
INVENTORS

BY Wenderoth, Lind
and Ponack,
Attorneys

Aug. 8, 1967　　　NOBUO SUGIMOTO ETAL　　3,334,787
VIBRATORY HOPPER FEEDER

Filed Oct. 11, 1965

N. Sugimoto & M. Miyano

INVENTORS

BY Wenderoth, Lind
and Ponack, Attorney

United States Patent Office 3,334,787
Patented Aug. 8, 1967

3,334,787
VIBRATORY HOPPER FEEDER
Nobuo Sugimoto and Minoru Miyano, Osaka-shi, Osaka-fu, Japan, assignors to Kisha Seizo Kabushiki Kaisha, Chiyoda-ku, Tokyo, Japan
Filed Oct. 11, 1965, Ser. No. 494,748
3 Claims. (Cl. 222—1)

It has been very difficult to smoothly feed coke, pig iron and steel scrap, etc., which are raw materials to be fed into a cupola or a converter, from a storage hopper, since such raw materials are in lump form and have an irregular shape and tend to block the outlet of the hopper as they flow out therefrom during feeding.

Therefore, various vibratory feeders have been made to solve this difficulty. In such conventional vibratory feeders, vibratory troughs are connected directly to the hoppers, and raw materials are discharged by vibration of the trough. However, it has been noted that raw materials still block the outlet, causing so-called bridging, and it has been impossible to smoothly discharge the raw materials.

This has been caused by the phenomenon that lumps of raw materials come to bear against each other as they flow out, preventing smooth discharging thereof, because the width of the opening at the bottom of the hopper is narrow as compared to the size of lumps of raw materials. This difficulty can theoretically be solved by simply widening said opening. But if the opening is made wider, the load on the trough of the vibratory feeder due to the mass of raw materials increases proportionally, making the amplitude of vibration small, and sometimes the vibration is reduced to nil. Therefore, the raw materials will not advance on the trough, making the discharging thereof impossible. Thus, the opening cannot simply be made larger as desired.

With the intention of effecting an improvement over this, we have developed a vibratory hopper feeder with a two-degree of freedom system as described below.

During the development of this new feeder, we found that the width of the opening at the bottom of a hopper should be about three times larger than the size of single pieces of lumps of raw materials. The present invention can be applied to discharging and transferring of various raw materials such as pig iron, scraps including used automobile engine block castings, coke, ferrosilicon and ferromanganese, etc. The present invention consists in providing an opening of generally rectangular form at the bottom of a hopper which stores raw materials temporarily, making the opening large enough to make the width of the narrow portion of the opening about three times larger than the size of the raw materials, arranging the lengthwise direction of the opening along the direction in which the raw materials are discharged and sent out by vibration of the trough, providing a lengthwise apron as a part of the frame, which moves correspondingly to the vibration of the trough, between the hopper opening and the trough in such a way that the length of the apron can be adjustable, and having the trough and the frame connected to each other by an elastic material. Thus the trough, the frame and the base constitute a so-called two-degree of freedom system. And the trough and the frame are caused to vibrate with the amplitudes in about an inverse proportion to their respective masses by driving a driving spring of the trough through an eccentric axle provided on the frame. Therefore, the apron provided between the hopper opening and the trough moves correspondingly to the vibration of the trough, and further, the weight of the raw materials will be supported by said apron and will not affect the trough, thus the apron can maintain a constant amplitude and direction of vibration. Although the formation of the two-degree of freedom system of this invention is based on conventional vibration machines in which the trough and the frame are connected together by such elastic material as a spring, the apron is integrally connected to the frame as a part thereof, and the weight of the frame is made larger than that of the trough, and thus the amplitude of vibration of the trough is larger than that of the apron.

Therefore, the raw materials move on the trough with a greater speed than the speed of the raw materials on the apron, and as the length of apron is adjustable, it is possible to maintain the amount of material near the outlet of the opening at the botom of a hopper rather small. Thus, the raw materials will not block each other.

The present invention will be described in detail referring to the attached drawings.

Figure 1:
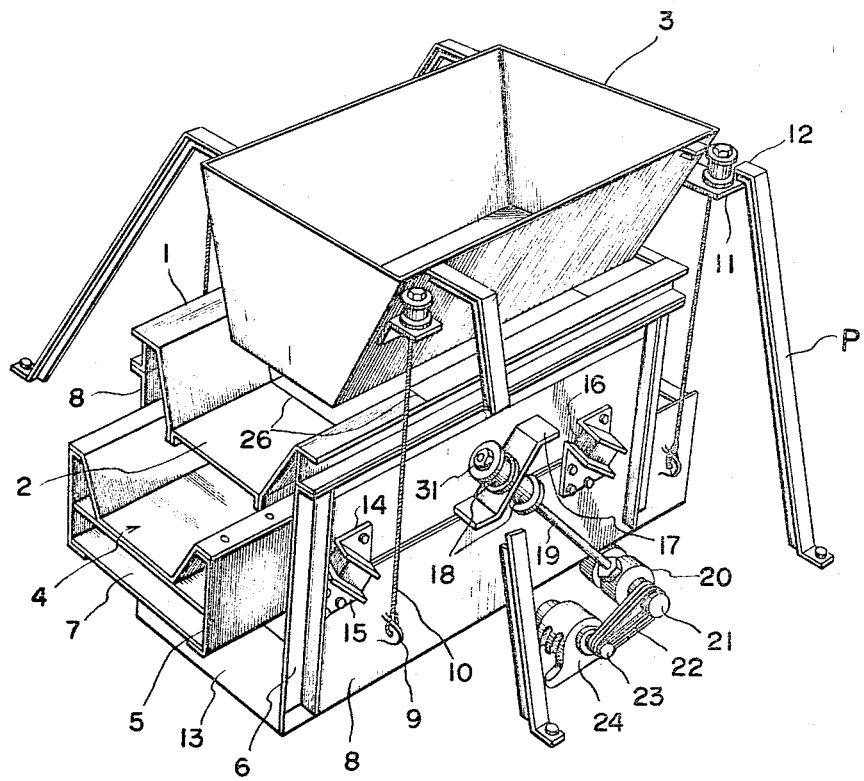
FIG. 1 is a perspective view of a vibratory hopper feeder.
Figure 2:
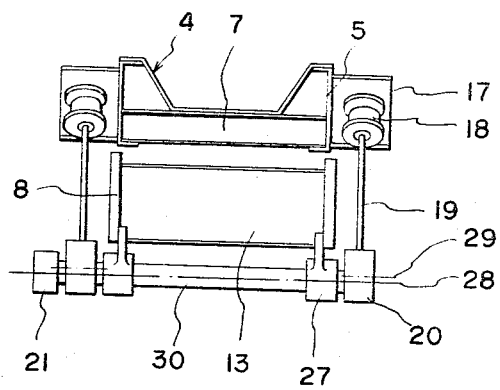
FIG. 2 is a rear elevational view of part of the lower portion of the feeder of FIG. 1 with a driving shaft.

A hopper is shown at 3, and raw materials will be fed therefrom. The angle of inclination of the walls of the hopper should be greater than the angle of repose of the raw materials. An apron is shown at 1, located under the hopper 3, and is attached to a frame 8 at four places through a supporting stand 6. The frame 8 comprises a framework having a horizontal transverse panel 13 connecting the side panels, and ears 9 on the side panels. Ropes 10 are elastically connected between the ears of the hopper 3 through vibration-restraining rubber mounting members 12 on supports 11 provided on hopper 3. The length of the apron having a base plate 2 is adjustable at the position 26. A trough 4 is located under the apron 1. The trough 3 is firmly fixed by bolts, etc. to the structure which comprises side plates 5 and a transverse panel 7 as its integral parts.

The trough 4 is connected to the frame 8 by connecting members 14 and 15 on the side plates 5 and the frame 8 respectively. Elastic material 16 is connected between connecting members 14 and 15. The side plates 5 have abutments 17 thereon, and driving springs 18 are mounted on each abutment 17. A rod 19 extends through the spring 18 and is held thereon by a nut 31 which threads onto threads provided on the rod 19, whereby the driving springs 18 are tightened to the abutments 17 on the trough 4.

The other end of the rods 19 are attached to bearing housings 20, and bearing housings 27 are attached to the frame 8. A driving shaft 30 extends through these bearing housings 20 and 27. 28 is the neutral axis and 29 is the eccentric axis of the driving shaft 30. The neutral axis 28 coincides with the center of the bearings of the bearing housing 27, while the eccentric axis 29 coincides with the center of the bearing housing 20. A V-pulley 21 is mounted on one end of shaft 30 concentric with the neutral axis 28. An electric motor 24 drives the V-pulley 21 through a V-pulley 23 and a V-belt 22.

When the driving shaft is rotated by the V-pulley 21 the driving spring 18 is operated depending on the degree of eccentricity of the rod 19. Since the trough 4 and the frame 8 are elastically connected together, and the frame 8 is also elastically connected with the hopper 3 which is supported at the four corners thereof on a base by supporting poles P, the trough 4 and the frame 8 constitute a two-degree of freedom vibration system.

The discharging end of the apron 1 is so built that it can be removed at the position 26, and if it is taken away the speed of movement of raw materials on the trough 4 is greater than the speed of raw materials on the apron 1, therefore, the lumps of the material will not block each other and the raw materials may be discharged and transferred smoothly.

When the vibratory feeder thus composed is operated, the trough 4 and the frame 8 will be operated with amplitudes of vibration in inverse proportion to the respective masses thereof.

The raw materials placed in the hopper 3 will be piled on the apron 1 and moved out by vibration of the apron, then quickly discharged by the trough 4. When there is a possibility that the raw materials may block each other between the hopper 3 and the apron 1, the outlet end of the apron 1 can be removed at the position 26, and the raw materials can be smoothly discharged without blocking each other, since the raw materials move on the trough 4 with a speed greater than that of the materials on the apron 1. The amplitude of vibration of the trough 4 will not become smaller than the amplitude of vibration of the raw materials in the hopper 3, because the more raw materials that are placed on the apron 1, the greater the amplitude of vibration of the trough 4 becomes, so that the materials may be more smoothly discharged.

The vibration of the frame 8 will be absorbed by vibration-restraint rubber members 12, and vibration can be given also to the hopper 3 by increasing the spring constant of vibration-restraint rubber members 12, so that it is also possible to prevent raw materials from blocking each other at the bottom of the hopper 3. It is also possible to install the frame 8 on the base through the vibration-restraint rubber members 12, by moving the rubber members to the bottom of the frame 8.

As explained above, this vibratory hopper feeder with a two-degree of freedom system has an apron with an adjustable length attached to the bottom of the hopper, said apron being fixed to the frame, and a trough is provided under the apron and is elastically connected to the frame, while the frame is attached to the hopper via an elastic material so that a two-degree of vibratory freedom system is provided. Because the apron and the frame are operated with amplitudes in an inverse proportion to the respective weights thereof, raw materials at the bottom of the hopper are prevented from blocking each other. Because vibratory trough is provided under the apron, the raw-materials will be smoothly discharged in a predetermined amount, and further, because the weight of the raw materials is supported by the apron, the amplitude of vibration of the trough will not become smaller, but rather it tends to become larger.

When the raw materials are thus smoothly discharged by the above mentioned trough, it is quite convenient for a subsequent step of charging the same into a cupola or a converter as explained above. However, there is a problem in using the above mentioned mechanism for charging of raw materials.

Figure 3:
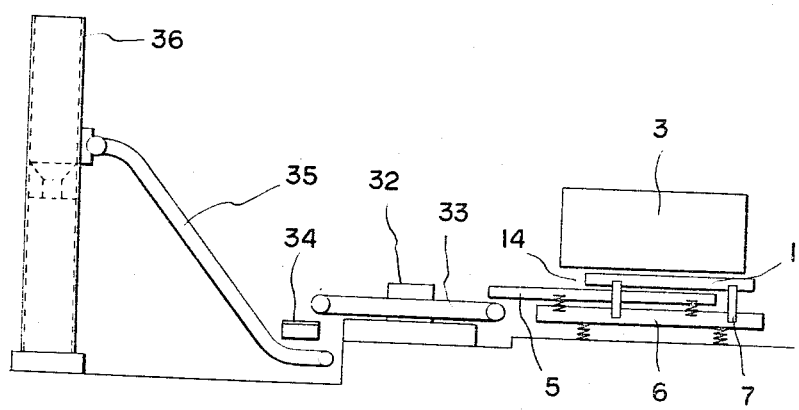
FIG. 3 is a side view showing the combination of the feeder with a conveyor and a weigher, etc., for feeding raw materials into a cupola or a converter.

That is, it is necessary to transfer a predetermined amount of raw materials for feeding a cupola or a converter, and the problem exists when the weight or a piece of lumps of raw material is larger than the maximum error permitted for measuring said predetermined amount. Therefore to overcome such problem, it is necessary to continuously provide in line with the vibratory hopper feeder with the two-degree of freedom system, a weigher for weighing raw materials which has an adjusting device for adjusting for a deviation in the weight from the established value, and which also has thereon a conveyor, so that the operation of the vibratory feeder is stopped when the weight of raw materials fed within an established time reaches the predetermined value, and after said time has passed, the operation is started again. An embodiment of such an arrangement will be explained with reference to FIGS. 3, 4 and 5.

The hopper is shown at 3, and raw materials in an amount sufficient for one day or an integral number, of such amounts, are stored therein. The bottom opening of the hopper 3 has a rectangular shape, and its lengthwise direction corresponds to the direction in which raw materials are discharged and transferred by vibration of the trough as previously explained. A vibratory hopper feeder with a two-degree of freedom system is provided under the hopper 3.

When the feeder is operated, the apron 1 under the hopper 3 and the trough 4 vibrate with the amplitude in an inverse proportion to the weight; therefore, the greater the weight of raw materials in the hopper 3, the greater the amplitude of vibration of the trough 4 while that of the apron 1 under the hopper becomes smaller. Thus, the amount of raw materials in the trough 4 at the outlet of the hopper 3 is always maintained comparatively small, and the materials will be smoothly fed, without blocking each other. The raw materials will not be dropped directly onto the trough 4 as the apron 1 is between the trough 4 and the hopper 3.

As the raw materials in the hopper 3 are gradually discharged and the amount becomes smaller, the amplitude of vibration of the apron 2 increases, while the amplitude of vibration of the trough 4 decreases, so that the amount of raw materials fed is generally maintained constant. The ratio of the weight of the apron 1 and the trough 4 will be so set that even when the hopper 3 becomes empty the amplitude of vibration of the apron is smaller than that of the trough.

Figure 4:
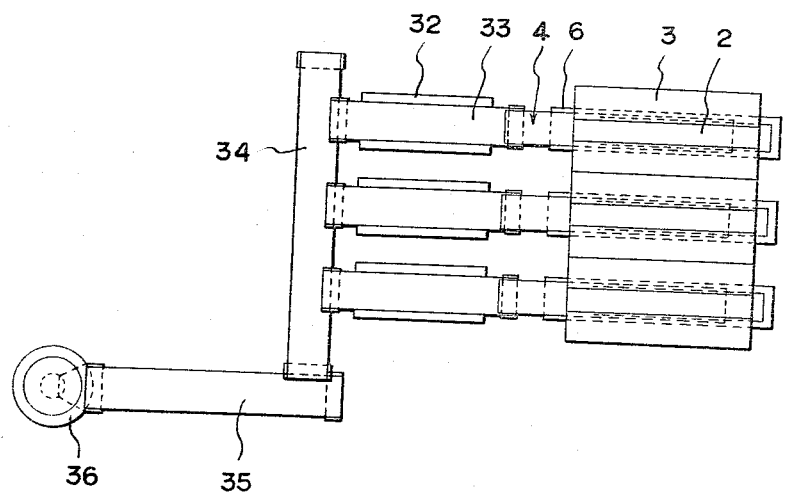
FIG. 4 is a plan view of the combination of FIG. 3.
Figure 5:
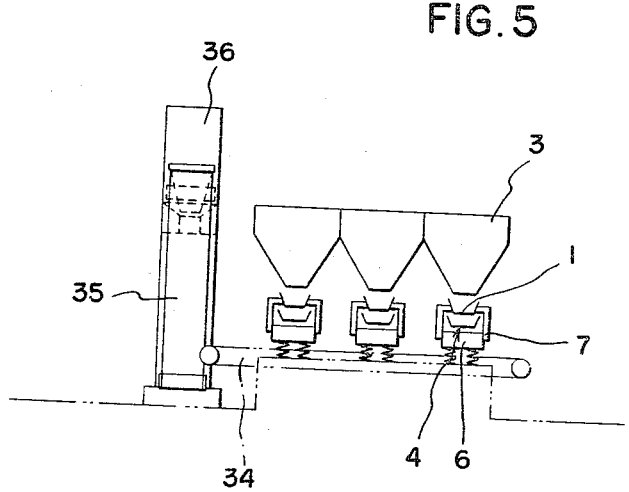
FIG. 5 is a front elevation view of the combination of FIG. 3.

A platform weighing scale is shown at 32, and carries thereon a conveyor 33. The platform weighing scale is used because when a conventional Merrick weighing scale is used to continuously weigh the materials, it is difficult to weigh within the predetermined allowance because the weight of a single piece of lumps of materials is comparatively large and its shape is irregular. Now, let us take an example of a feeding apparatus for a cupola (FIGS. 4 and 5). When a unit measuring time for raw materials is 3 minutes and the amount weighed within that time must have a maximum deviation of ±2%, and if the weight of a single piece of raw material is larger than said ±2% allowance, accurate weighing cannot be done.

Therefore, in order to adjust this, a timer is provided for the vibratory feeder so that when the weight of raw materials discharged out of the vibratory hopper feeder with the two-degree of freedom system onto the conveyor 32 exceeds a predetermined weight, a signal is sent to automatically stop the operation of the vibratory feeder. After a predetermined time has passed, the operation is started again.

While repeating this, as the platform weighing scale 32 has therewithin an error-adjusting device, the amount weighed in excess of the predetermined amount once will be adjusted in the next weighing, so that the error will be reduced to within the maximum allowance by a predetermined number of weighings.

Thus, the raw materials transferred in a predetermined amount at a time will be placed on a collective conveyor 34 and then fed into cupola 36 by conveyor 35.

To date, automatic feeding to a cupola or converter has been considered impossible and the feeding has been done solely by manual operation. Such difficulty is now solved by the present invention.

What is claimed is:

1. A vibratory hopper feeder which comprises a fixed hopper and base assembly having a bottom opening large enough for preventing the pieces of materials being fed from blocking each other, a movable apron positioned under the hopper for bearing the weight of raw materials and adjusting the amount of the materials to be supplied, a lower frame on which said apron is mounted, said lower frame being supported elastically on said hopper and base assembly, and a trough for feeding raw materials located beneath said apron and between said apron and said lower frame, said trough and said lower frame being connected together elastically, said trough having an abutment on its side, spring means on said abutment, a rod connected to said spring means, and vibration means to which said rod and said lower frame are coupled, whereby said trough and said lower frame vibrate with an amplitude in inverse proportion to the mass thereof.

2. An apparatus for feeding a predetermined amount of raw materials in lump form, which comprises a vibratory hopper feeder which comprises a fixed hopper and base assembly having a bottom opening large enough for preventing the pieces of materials being fed from blocking each other, a movable apron positioned under the hopper for bearing the weight of raw materials and adjusting the amount of the materials to be supplied, a lower frame on which said apron is mounted, said lower frame being supported elastically on said hopper and base assembly, and a trough for feeding raw materials located beneath said apron and between said apron and said lower frame, said trough and said lower frame being connected together elastically, said trough having an abutment on its side, spring means on said abutment, a rod connected to said spring means, and vibration means to which said rod and said lower frame are coupled, whereby said trough and said lower frame vibrate with an amplitude in inverse proportion to the mass thereof; a platform weighing scale having a weighing error adjusting device therein and a carrying conveyor thereon located adjacent to the raw material discharging outlet of said trough; and control means coupled between said weighing scale and said vibration means for stopping the operation of the vibratory hopper feeder when the weight of raw materials discharged out of the hopper feeder and received on the conveyor reaches a predetermined weight within an established length of time for weighing, and then starting the operation again after the esablished length of time has passed, whereby the raw materials in lump shape are fed in a predetermined amount over a given length of time.

3. A method of feeding a predetermined amount of lump raw materials which comprises providing a plurality of vibratory hopper feeders in side by side relationship; each of which comprises a fixed hopper and base assembly having a bottom opening large enough for preventing the materials being fed from blocking each other, a movable apron positioned under the hopper for bearing the weight of raw materials and adjusting the amount of the materials to be supplied, a lower frame on which said apron is mounted, said lower frame being supported elastically on said hopper and base assembly, and a trough for feeding raw materials located beneath said apron and between said apron and said lower frame, said trough and said lower frame being connected together elastically, said trough having an abutment on its side, spring means on said abutment, a rod connected to said spring means, and vibration means to which said rod and said lower frame are coupled, whereby said trough and said lower frame vibrate with an amplitude in inverse porportion to the mass thereof; filling each hopper with an amount of raw material equal to an integral number of days requirements of such materials; operating the hopper feeders to discharge out of the vibratory hopper feeders; weighing and transferring the discharged materials from each hopper feeder for a predetermined length of time by means of a platform weighing scale having a conveyor thereon for carrying said raw materials; when the amount of any of the materials weighed in the predetermined length of time exceeds the amount of that material to be fed by more than allowable errors, stopping the operation of the respective vibratory hopper feeder; after the predetermined length of time has passed, starting the operation of the respective hopper feeder again; repeating this process and adjusting the amount weighed in excess of the predetermined amount during a next weighing in a direction to bring the error down within the maximum allowance within a certain number of weighings; and collecting the thus weighed raw materials and feeding them to a cupola or a converter.

References Cited
UNITED STATES PATENTS 2,366,075 12/1944 Weyandt _____ 222—55
3,028,053 4/1962 Brown et al. _____ 222—55 X

FOREIGN PATENTS 545,869 3/1956 Belgium.

ROBERT B. REEVES, *Primary Examiner.*
HADD S. LANE, *Examiner.*